(12) United States Patent
Matsumoto

(10) Patent No.: US 9,798,076 B2
(45) Date of Patent: Oct. 24, 2017

(54) LIGHT SOURCE DEVICE AND DISPLAY APPARATUS

(71) Applicant: Sakai Display Products Corporation, Sakai-shi, Osaka (JP)

(72) Inventor: Kouji Matsumoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/911,408

(22) PCT Filed: Jul. 24, 2014

(86) PCT No.: PCT/JP2014/069587
§ 371 (c)(1),
(2) Date: Feb. 10, 2016

(87) PCT Pub. No.: WO2015/022849
PCT Pub. Date: Feb. 19, 2015

(65) Prior Publication Data
US 2016/0187560 A1 Jun. 30, 2016

(30) Foreign Application Priority Data

Aug. 12, 2013 (JP) ................. 2013-167583

(51) Int. Cl.
*G02F 1/1335* (2006.01)
*F21V 8/00* (2006.01)
*G02F 1/1333* (2006.01)

(52) U.S. Cl.
CPC ........... *G02B 6/009* (2013.01); *G02B 6/0085* (2013.01); *G02B 6/0091* (2013.01);
(Continued)

(58) Field of Classification Search
CPC ... G02F 1/133308; G02F 2001/133317; G02F 1/133615; G02F 2001/133314;
(Continued)

(56) References Cited

U.S. PATENT DOCUMENTS

2008/0080211 A1  4/2008  Chuang et al.
2010/0165244 A1* 7/2010  Shin .................. G02F 1/133308
                                                         349/62
(Continued)

FOREIGN PATENT DOCUMENTS

CN   101158763 A   4/2008
CN   102588846 A   7/2012
(Continued)

*Primary Examiner* — Elmito Breval
*Assistant Examiner* — Fatima Farokhrooz
(74) *Attorney, Agent, or Firm* — Rudy J. Ng; Bret E. Field; Bozicevic, Field & Francis LLP

(57) ABSTRACT

Provided are: a light source device capable of preventing light from a light source disposed to face an end surface of a light guide plate from leaking to a side in which the light guide plate emits the light without providing a new member; and a display apparatus including the light source device. A light source unit 2 is disposed to face an end surface of a light guide plate 3, and a heat spreader supporting the light source unit 2 has a shape of covering the light source unit 2. A light from the light source unit 2 is irradiated to the end surface of the light guide plate 3, as well as the protrusive plates 71 and 72 side of the heat spreader. Since the light irradiated to the protrusive plate 71 side is shielded by the protrusive plate 71, the light does not leak to a panel chassis 5 side.

8 Claims, 7 Drawing Sheets

(52) U.S. Cl.
CPC .. *G02F 1/133308* (2013.01); *G02F 1/133615* (2013.01); *G02F 2001/133314* (2013.01)

(58) Field of Classification Search
CPC .... G02B 6/0081; G02B 6/0085; G02B 6/009; G02B 6/0091
See application file for complete search history.

(56) References Cited

U.S. PATENT DOCUMENTS

| | | | | |
|---|---|---|---|---|
| 2011/0096569 | A1* | 4/2011 | Hamada | G02B 6/0085 362/613 |
| 2012/0287352 | A1* | 11/2012 | Takata | G02B 6/003 348/739 |
| 2013/0235297 | A1 | 9/2013 | Yu et al. | |
| 2014/0009962 | A1* | 1/2014 | Kang | G02B 6/0011 362/612 |
| 2014/0056024 | A1* | 2/2014 | Kim | G02B 6/003 362/608 |
| 2014/0125913 | A1* | 5/2014 | Lee | G02F 1/133615 349/58 |
| 2014/0226073 | A1 | 8/2014 | Kamada | |
| 2014/0307464 | A1* | 10/2014 | Horiuchi | G02B 6/0091 362/602 |
| 2014/0307470 | A1* | 10/2014 | Horiuchi | G02B 6/0031 362/609 |
| 2014/0320747 | A1* | 10/2014 | Kamada | G02B 6/0085 348/725 |
| 2016/0011357 | A1* | 1/2016 | Wang | G02B 6/0068 362/606 |
| 2016/0187560 | A1* | 6/2016 | Matsumoto | G02F 1/133308 362/611 |

FOREIGN PATENT DOCUMENTS

| | | |
|---|---|---|
| JP | 2003-281924 A | 10/2003 |
| JP | 2008-91317 A | 4/2008 |
| JP | 2013-131407 A | 7/2013 |
| WO | WO2013051473 A1 | 4/2013 |

* cited by examiner

LIGHT SOURCE DEVICE AND DISPLAY APPARATUS

CROSS-REFERENCE TO RELATED APPLICATION

This application is the national phase under 35 U.S.C. §371 of PCT International Application No. PCT/JP2014/069587 which has an International filing date of Jul. 24, 2014 and designated the United States of America.

BACKGROUND

1. Technical Field

The present invention relates to an edge light type light source device and a display apparatus including the light source device.

2. Description of Related Art

Recently, a display apparatus such as a liquid crystal display and a liquid crystal television has been widely spread. Such the display apparatus includes: a rectangular plate-shaped display panel which has a display screen displaying an image on a front side; and a light source device which is disposed on a rear side of the display panel to emit light to the display panel. There is an edge light type light source device in which a light guide plate is disposed on the rear side of the display panel and a light source such as a light emitting diode (LED) is disposed on an end surface side of the light guide plate. In the edge light type light source device, light made incident in the end surface of the light guide plate is emitted from one surface of the light guide plate while diffusing in the light guide plate, and is made incident in the display panel.

FIG. 1 is an exploded perspective view illustrating a configuration of major components of a conventional display apparatus, and FIG. 2 is a longitudinal sectional view of the conventional display apparatus. Further, FIG. 2 illustrates only the longitudinal sectional view of a place in which a light source unit is disposed in the conventional display apparatus.

In a conventional edge light type light source device, for example, a light source unit 2 in which a light source 20 is mounted on a strip-shaped substrate 21 in a long side direction is disposed to face one end surface of a rectangular light guide plate 3. Further, the light guide plate 3 has an optical sheet 31 adhered to one surface thereof, and a reflection sheet 32 adhered to the other surface thereof. The light source unit 2 is supported by a heat spreader 9. The heat spreader 9 has a support plate 90 which supports the substrate 21 of the light source unit 2 and a protrusive plate 91 which is provided with a light guide plate pressing portion 92 abutting against the reflection sheet 32, and is formed in an L-shape.

A backlight chassis 6 (hereinafter, referred to as a BL chassis 6) has a shape in which one sidewall and a part of a bottom plate connecting to the one sidewall are cut from a dish-shape. The protrusive plate 91 of the heat spreader 9 is configured so that a protruded end thereof is engaged with an end part (a place in which the sidewall is cut) of the bottom plate of the BL chassis 6, and the heat spreader 9 and the BL chassis 6 support the light source unit 2 and the light guide plate 3 with being engaged with each other. The light source unit 2 and the light guide plate 3 supported by the heat spreader 9 and the BL chassis 6 are covered with a panel chassis 5 from the optical sheet 31 side at a peripheral edge of the light guide plate 3, and are clamped by the panel chassis 5, the heat spreader 9 and the BL chassis 6. By the above-described configuration, a light source device is achieved. In addition, with respect to the light source device having the above-described configuration, a liquid crystal panel 1 is disposed so that one surface thereof faces the light guide plate 3 (optical sheet 31), and a peripheral edge of the liquid crystal panel 1 is covered with a bezel 4 from an outside (a display screen side), to achieve a display apparatus.

In the display apparatus having the above-described configuration, as illustrated in FIG. 2 by arrows, light from the light source unit 2 is emitted to not only the light guide plate 3 but also the display screen side, etc., and the light emitted to the display screen side reaches the panel chassis 5. Generally, the panel chassis 5 is often made of a resin, and in the case of a resin product, the light reaching the panel chassis 5 is transmitted through the panel chassis 5. When the light transmitted through the panel chassis 5 passes through between the bezel 4 and the liquid crystal panel 1, light leakage occurs at the peripheral edge part of the liquid crystal panel 1. Further, when the light transmitted through the panel chassis 5 is made incident in the liquid crystal panel 1, luminance at one end part (an end part on a side in which light source unit 2 is provided) of the liquid crystal panel 1 is increased.

Japanese Patent Application Laid-Open No. 2008-91317 proposes a backlight module including a light source and a light guide plate, wherein a reflection region (a reflection surface) is provided around the light source, in order to allow the light from the light source to be efficiently made incident in a light incident surface of the light guide plate.

SUMMARY

However, the invention disclosed in Japanese Patent Application Laid-Open No. 2008-91317 is a configuration which is provided with the reflection region for guiding the light from the light source to the light incident surface of the light guide plate, and prevention of the light leakage that the light from the light source leaks to the display screen side is not considered. Further, it is necessary for the invention disclosed in Japanese Patent Application Laid-Open No. 2008-91317 to newly provide members (a second frame and a second reflection region) for reflecting the light emitted from the light source to the display screen side, while having problems that an addition of manufacturing and assembling processes, and an increase of costs occur.

The present invention has been made with the aim of solving the above problems. And it is an object of the present invention to provide a light source device capable of preventing light from a light source facing an end surface of the light guide plate from leaking to a side in which the light guide plate emits the light without providing a new member, and a display apparatus including the light source device.

A light source device according to one embodiment of the present invention comprises: a light guide plate; a light source disposed to face an end surface of the light guide plate; a heat dissipator which supports the light source; and a holding member which is connected to the heat dissipator and holds the light source and the light guide plate, and light made incident in the light guide plate through the end surface thereof from the light source is emitted from one surface of the light guide plate. The light source device according to the embodiment of the present invention comprises a frame member which covers the light source from the one surface side of the light guide plate and holds the light guide plate, and the heat dissipator has a light shielding portion which is disposed between the light source and an inner surface of the frame member facing the light source.

According to the embodiment of the present invention, the light source disposed to face the end surface of the light guide plate is supported by the heat dissipator. The holding member connected to the heat dissipator holds the light source and the light guide plate. The light source device has the frame member which covers the light source from the one surface side in which the light guide plate emits the light, and holds the light guide plate. And the heat dissipator has the light shielding portion provided between the light source and the inner surface of the frame member facing the light source. By providing the light shielding portion on the inner surface side of the frame member, the light from the light source does not reach the frame member, and thereby is not transmitted through the frame member.

In the light source device according to the embodiment of the present invention, it is preferred that the heat dissipator has a support plate which supports the light source from a rear side of a surface at which the light source faces the light guide plate, the light shielding portion which abuts against the inner surface of the frame member and protrudes from an end part of the support plate, and a protrusive plate which protrudes in the same direction as the light shielding portion from an opposite end part of the support plate which is opposite to the end part thereof.

According to the preferred embodiment of the present invention, the heat dissipator has the support plate which supports the light source, and the light shielding portion and the protrusive plate which extend respectively from two opposite end parts of the support plate. In the preferred embodiment, the heat dissipator covers the light source by the support plate, the light shielding portion and the protrusive plate, such that it is possible to prevent the light from the light source from reaching the frame member.

In the light source device according to the embodiment of the present invention, it is preferred that the light shielding portion and the protrusive plate have a shape of overlapping with an end edge part including the end surface of the light guide plate.

According to the preferred embodiment of the present invention, since the light shielding portion and the protrusive plate of the heat dissipator have a shape of overlapping with the end surface of the light guide plate, specifically, a shape of overlapping with the end edge part thereof facing the light source, it is possible to securely prevent the light from the light source from emitting (leaking) to a direction other than the end surface of the light guide plate.

In the light source device according to the embodiment of the present invention, it is preferred that the protrusive plate has a groove formed in a surface thereof facing the light source at a place connecting to the support plate.

According to the preferred embodiment of the present invention, by sliding the light source along the groove provided in the heat dissipator, it is possible to easily attach the light source to the heat dissipator.

In the light source device according to the embodiment of the present invention, it is preferred that the light source has a plate member, and is supported by the heat dissipator when an end part of the plate member is fitted into the groove along the groove.

According to the preferred embodiment of the present invention, the light source has the plate member, and the end part of the plate member is fitted into the groove of the heat dissipator by sliding along the groove, such that it is possible to securely attach the light source to the heat dissipator.

In the light source device according to the embodiment of the present invention, it is preferred that the holding member has a holding plate which holds the light guide plate from the other surface side thereof, the protrusive plate is configured so as to hold the light source and the light guide plate from the other surface side, and the protrusive plate and the holding plate have engaging portions which are engaged with each other.

According to the preferred embodiment of the present invention, by engaging the holding plate of the holding member and the protrusive plate of the heat dissipator which hold the light guide plate from the same surface side (the other surface side) as each other, the heat dissipator and the holding member are connected with each other. Thereby, in the preferred embodiment, it is possible to easily and appropriately connect the heat dissipator and the holding member.

A display apparatus according to one embodiment of the present invention comprises: the above-described light source device; and a display panel which displays an image using light emitted from the light source device.

According to the embodiment of the present invention, since the light from the light source does not leak to the side in which the light guide plate emits the light, it is possible to prevent the light from the light source from leaking to the liquid crystal panel side in which the light guide plate emits the light.

According to one embodiment of the present invention, the light source disposed to face the end surface of the light guide plate is supported by the heat dissipator, and the light source and the light guide plate are held by the holding member which is connected to the heat dissipator. In the embodiment, the light source device has the frame member which covers the light source from the one surface side in which the light guide plate emits the light and holds the light guide plate, and the heat dissipator has the light shielding portion provided between the light source and the inner surface of the frame member facing the light source. In the embodiment, by providing the light shielding portion on the inner surface side of the frame member, the light from the light source does not reach the frame member. Thereby, the light from the light source does not transmit through the frame member, such that in the display apparatus using such the light source device, it is possible to prevent the light from the light source from leaking to the display screen side. In addition, by providing such the light shielding portion in the heat dissipator, it is possible to prevent the light leakage without providing a new member.

The above and further objects and features will more fully be apparent from the following detailed description with accompanying drawings.

DETAILED DESCRIPTION

The following will describe in detail a light source device and a display apparatus including the light source device according to the present invention with reference to the drawings illustrating some embodiments thereof.

Embodiment 1

Figure 1:
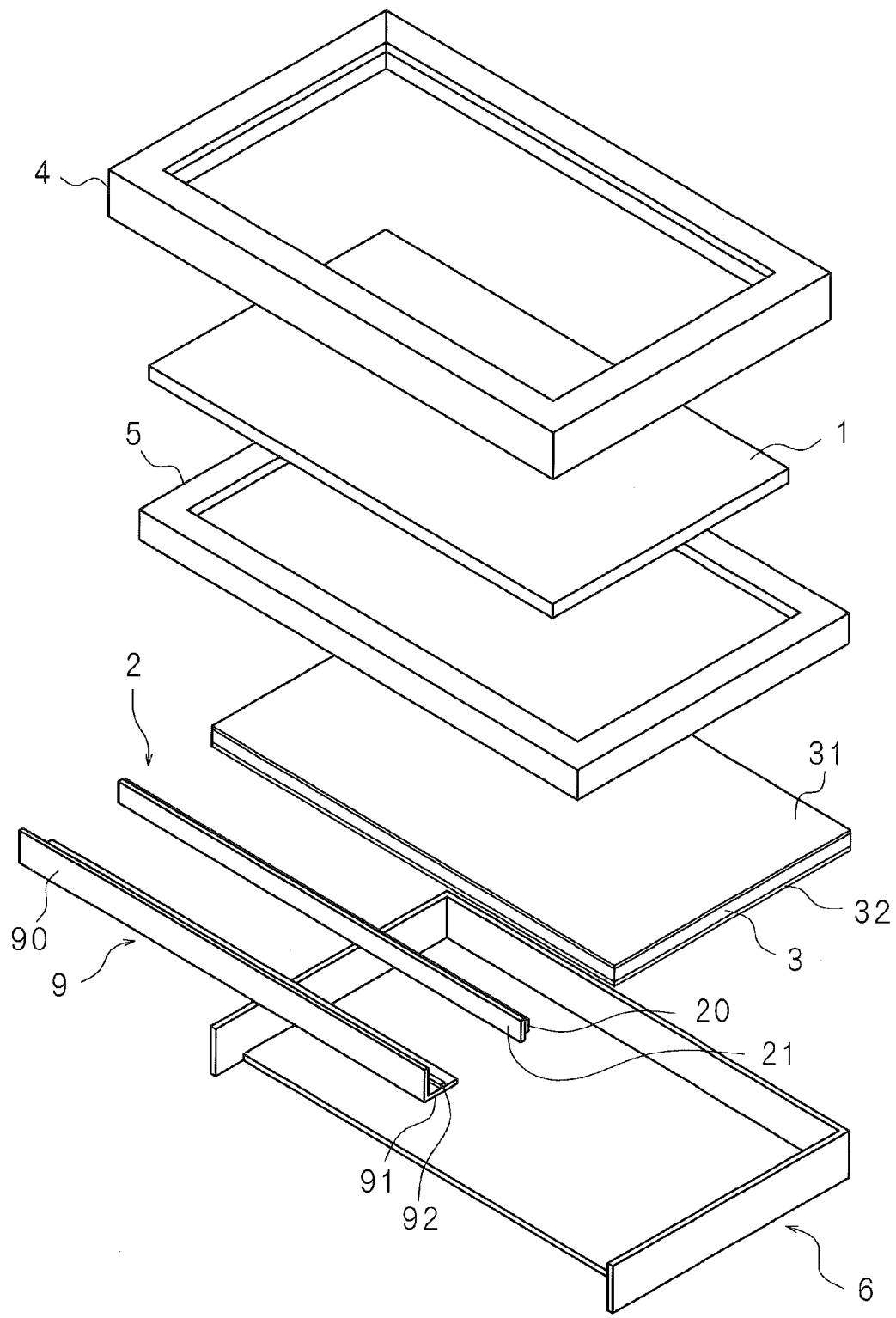
FIG. 1 is an exploded perspective view illustrating a configuration of major components of a conventional display apparatus.
Figure 2:
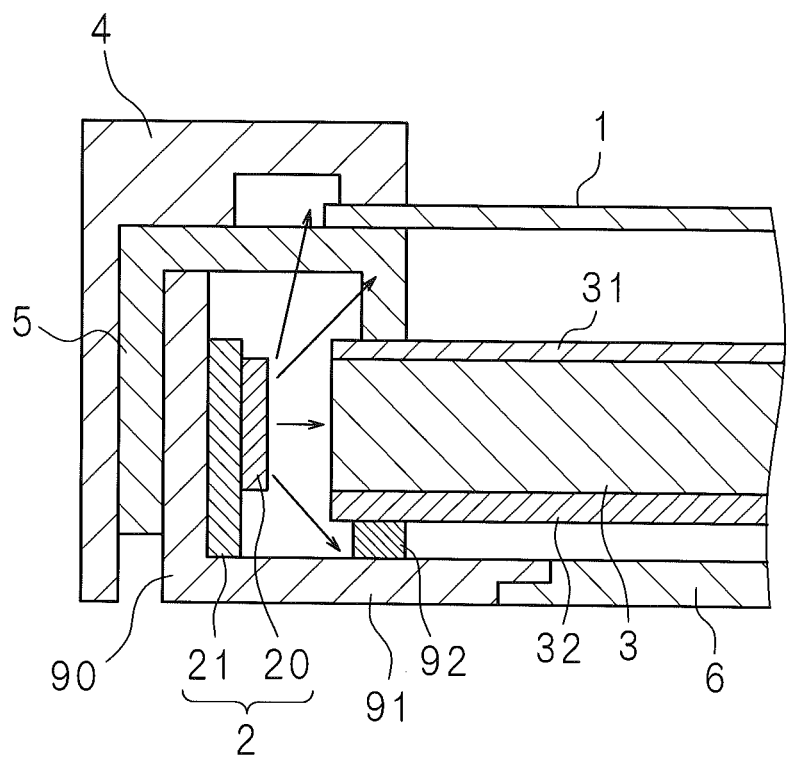
FIG. 2 is a longitudinal sectional view of the conventional display apparatus.
Figure 3:
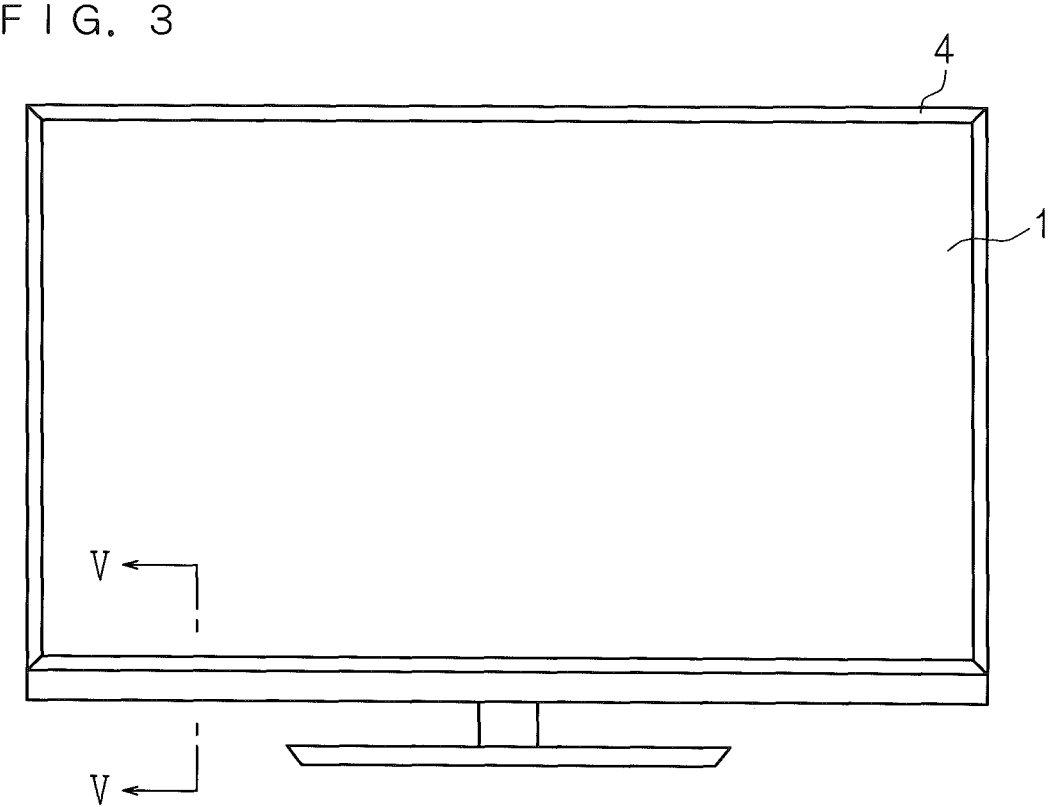
FIG. 3 is a front view of a display apparatus according to Embodiment 1.
Figure 4:
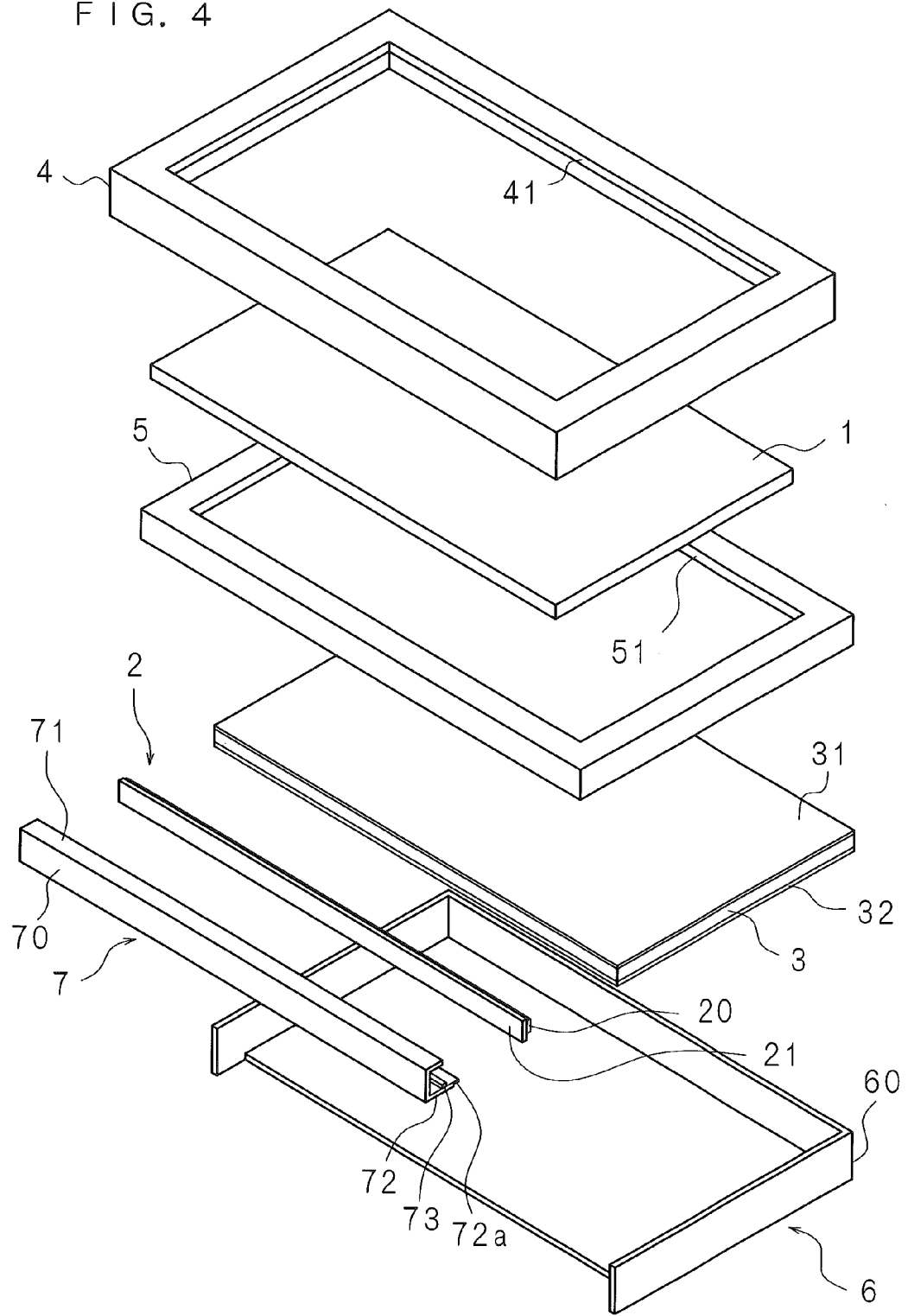
FIG. 4 is an exploded perspective view illustrating a configuration of major components of the display apparatus according to Embodiment 1.
Figure 5:
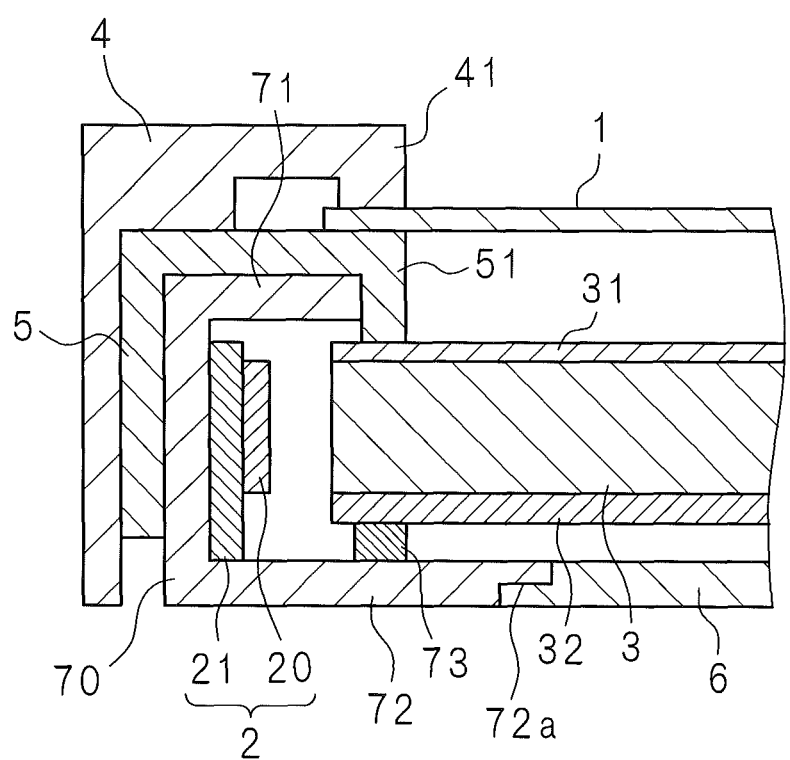
FIG. 5 is a longitudinal sectional view taken on line V-V in FIG. 3.

FIG. 3 is a front view of a display apparatus according to Embodiment 1, FIG. 4 is an exploded perspective view illustrating a configuration of major components of the display apparatus according to Embodiment 1, and FIG. 5 is a longitudinal sectional view taken on line V-V in FIG. 3. The display apparatus of Embodiment 1 is a liquid crystal display apparatus including a rectangular plate-shaped liquid crystal panel (display panel) 1 and an edge light type light source device.

The light source device of Embodiment 1 includes a light source unit 2, a light guide plate 3, a panel chassis (frame member) 5, BL chassis (holding member) 6, a heat spreader (heat dissipator) 7, and the like.

The light source unit 2 has a strip-shaped substrate 21 and a light source 20 mounted on the substrate 21. The light source 20 is, for example, a plurality of light emitting diodes (LEDs) mounted on the substrate 21 in a longitudinal direction thereof. The light source unit 2 may be a cold cathode fluorescent lamp (CCFL), an external electrode fluorescent lamp (EEFL), a hot cathode fluorescent lamp (HCFL), or the like.

The light guide plate 3 is made of a high transparency synthetic resin such as an acrylic resin or a polycarbonate resin, and is formed in a rectangular plate shape. The light guide plate 3 has an optical sheet 31 adhered to one surface thereof, and a reflection sheet 32 adhered to the other surface thereof. The reflection sheet 32 is a sheet made of a synthetic resin having high reflection properties. The optical sheet 31 is a sheet in which a diffusion sheet, a prism sheet, a polarizing sheet and the like are laminated, for example. The diffusion sheet is, for example, a film made of polyethylene terephthalate (PET) or a film made of a polycarbonate resin, and has a function to diffuse the incident light. The prism sheet is formed by, for example, molding regular prism patterns with an acryl resin on one surface of a sheet material made of polyester. The polarizing sheet is, for example, a film made of polyethylene terephthalate, and has a function to convert the incident light into a linearly polarized light. The optical sheet 31 may be held with a state of being spaced appropriately from one surface of the light guide plate 3, in addition to the configuration of being adhered to the one surface of the light guide plate 3.

The light source unit 2 having the above-described configuration is, for example, disposed to face a lower end surface of the light guide plate 3 so that the light from the light source 20 is made incident thereon. The light source device may include two light source units 2, and in the case of including two light source units 2, for example, the light source units 2 may be respectively disposed to face right and left end surfaces of the light guide plate 3, or may be respectively disposed to face upper and lower end surfaces of the light guide plate 3.

The BL chassis 6 is a metallic member having a shape in which one sidewall (a sidewall on a front long side in FIG. 4) and a part of a bottom plate connecting to the one sidewall are cut from a dish-shape. The BL chassis 6 has the bottom plate which is a rectangular flat plate having a slightly smaller length in a short side direction than the light guide plate 3 on which the optical sheet 31 and the reflection sheet 32 are adhered (hereinafter, briefly referred to as the light guide plate 3), and a protrusion plate 60 which vertically stands from one long side and two short sides of the bottom plate to the same direction as each other. Further, the protrusion plates which stand from the two short sides are provided so as to be slightly longer than the short sides of the bottom plate.

The heat spreader 7 is a metallic member which has a rectangular support plate 70, and protrusive plates 71 and 72 protruding in the same direction as each other from two long sides of the support plate 70, and has a cross-section formed in substantially a U-shape at a plane orthogonal to the long side. One protrusive plate 72 protrudes longer than the other protrusive plate 71, and has a light guide plate pressing portion 73 which abuts against the light guide plate 3 as described below at a place facing a protruded end of the other protrusive plate 71. In addition, the protrusive plate 72 has a recess 72a along the protruded end at an outer surface on the protruded end side thereof. It is preferable that the heat spreader 7 is made of metal having a high thermal conductivity such as aluminum or cupper, so as to efficiently release heat.

The light source unit 2 disposed to face a lower end surface of the light guide plate 3 is supported in such a way that a back surface of the substrate 21 (a rear surface of a mounding surface of the light source 20) is attached to the support plate 70 of the heat spreader 7. Further, the light source unit 2 is attached to a surface of the support plate 70 on a side in which the protrusive plates 71 and 72 protrude, and is in a state of being covered with the support plate 70 and the protrusive plates 71 and 72. The protruded ends of the protrusive plates 71 and 72 overlap with the end edge parts of the light guide plate 3 on the light source unit 2 side, and the light guide plate pressing portion 73 provided on the protrusive plate 72 abuts against an end edge part of the reflection sheet 32 on the light source unit 2 side.

As illustrated in FIG. 5, the BL chassis 6 is provided with a recess on an upper surface of the bottom plate along an end surface of the bottom plate, which is configured to be engaged with the recess 72a of the heat spreader 7. Thereby, the heat spreader 7 engages with the recess of the BL chassis 6 by the recess 72a while holding the light source unit 2, and supports the light guide plate 3 together with the BL chassis 6 from the reflection sheet 32 side.

The panel chassis 5 is a rectangular frame-shaped resin member slightly larger than the light guide plate 3, and has a light guide plate pressing portion 51 which abuts against the light guide plate 3 and is formed along an opening portion of the panel chassis 5. The panel chassis 5 covers the peripheral edge of the light guide plate 3 from the optical sheet 31 side. Further, the panel chassis 5 covers the peripheral edge of the light guide plate 3, in a state in which the light source unit 2 and the light guide plate 3 are supported by the heat spreader 7 and the BL chassis 6 as described above. Thereby, the light source unit 2 is supported by the BL chassis 6 and the panel chassis 5 through the heat spreader 7.

When the panel chassis 5 covers the peripheral edge of the light guide plate 3, the light guide plate pressing portion 51 abuts against the peripheral edge of the optical sheet 31, and an inner peripheral surface of the panel chassis 5 abuts against outer peripheral surfaces of the support plate 70 and the protrusive plate 71 of the heat spreader 7. Specifically, the support plate 70 abuts against the inner surface of one sidewall (a lower sidewall) of the panel chassis 5, and the protrusive plate 71 abuts against the inner surface of the panel chassis 5 on a front side thereof. Thereby, a lower end edge part of the light guide plate 3 are clamped by the light guide plate pressing portion 51 of the panel chassis 5 and the light guide plate pressing portion 73 of the heat spreader 7. Further, the peripheral edge parts other than the lower end side of the light guide plate 3 are clamped by the light guide plate pressing portion 51 of the panel chassis 5 and the BL chassis 6. By the above-described configuration, the light source unit 2 and the light guide plate 3 are supported by the panel chassis 5, the heat spreader 7 and the BL chassis 6. Thereby, the light source device which irradiates the liquid crystal panel 1 with light is achieved by the light source unit 2, the light guide plate 3, the optical sheet 31, the reflection sheet 32, the panel chassis 5, the heat spreader 7 and the BL chassis 6.

The liquid crystal panel 1 is formed by arranging a plurality of liquid crystal elements in a two-dimensional matrix shape, for example. The liquid crystal panel 1 is formed in a rectangular plate shape having a size substantially the same as the light guide plate 3, and is placed on the panel chassis 5 in a state where one surface thereof faces the light guide plate 3 (optical sheet 31).

The bezel 4 is a frame-shaped metallic member formed in the same shape and having substantially the same size as the panel chassis 5, and has a panel pressing portion 41 which abuts against the liquid crystal panel 1 and is formed along an opening portion of the bezel 4. The bezel 4 covers a peripheral edge of the liquid crystal panel 1 placed on the light source device (panel chassis 5) from an outside (a display screen side). Further, the bezel 4 covers the liquid crystal panel 1 by abutting against the peripheral edge of the display screen of the liquid crystal panel 1 with the panel pressing portion 41 and abutting against the outer peripheral surface of the panel chassis 5 with an inner peripheral surface thereof. Thus, the liquid crystal panel 1 is clamped by the panel pressing portion 41 of the bezel 4 and the peripheral edge part of the opening portion of the panel chassis 5. Thereby, the display apparatus illustrated in FIGS. 3 to 5 is formed.

In the display apparatus having the above-described configuration, light emitted from the light source unit 2 (the light source 20) is made incident in the light guide plate 3 through the lower end surface thereof, and is reflected by the reflection sheet 32, then passes through the light guide plate 3 and the optical sheet 31 to irradiate the liquid crystal panel 1 with flat light. Further, the light guide plate 3 may have patterns formed on a surface thereof on which the optical sheet 31 is provided, so as to appropriately direct the emitted light in the liquid crystal panel 1 direction. In this case, the light emitted from the light guide plate 3 can be transferred to the optical sheet 31 more uniformly.

In Embodiment 1, a space in which the light source unit 2 is disposed is covered with the heat spreader 7. Specifically, the protrusive plate 71 and the support plate 70 of the heat spreader 7 are provided between the light source unit 2 and the inner surface of the panel chassis 5 facing the light source unit 2. The heat spreader 7 is made of a metal, and does not allow the light from the light source unit 2 to be transmitted therethrough, such that the light from the light source unit 2 does not reach the panel chassis 5 side by the protrusive plate (a light shielding portion) 71. That is, the light from the light source unit 2 does not reach the front side (the display screen side of the display apparatus) of the panel chassis 5.

Conventionally, the light from the light source unit 2 is transmitted through the panel chassis 5, and passes through a gap between the bezel 4 and the liquid crystal panel 1, such that light leakage occurs, as well as, the light transmitted through the panel chassis 5 is made incident in the liquid crystal panel 1, such that luminance at one end part of the liquid crystal panel 1 is increased. However, in Embodiment 1, since the light from the light source unit 2 is shielded (light shielded) by the protrusive plate 71 of the heat spreader 7, it does not reach the panel chassis 5, and as a result, the light does not pass through between the bezel 4 and the liquid crystal panel 1. Thereby, according to Embodiment 1, in the liquid crystal panel 1, the light leakage does not occur at the end part (the lower end part in the example of Embodiment 1) in which the light source unit 2 is provided, and thus the luminance at the end part is not increased. In addition, in Embodiment 1, since the light source device is formed by using the heat spreader 7 which is originally required in the display apparatus, an increase of manufacturing and assembling processes or an increase of costs do not occur.

Embodiment 2

Hereinafter, a display apparatus according to Embodiment 2 will be described. The display apparatus of Embodiment 2 is different from the above-described display apparatus of Embodiment 1 in terms of only the configuration of a heat spreader 7. Accordingly, only the heat spreader 7 will be described, and the other components thereof will be denoted by the same reference numerals as Embodiment 1, and will not be described.

Figure 6:
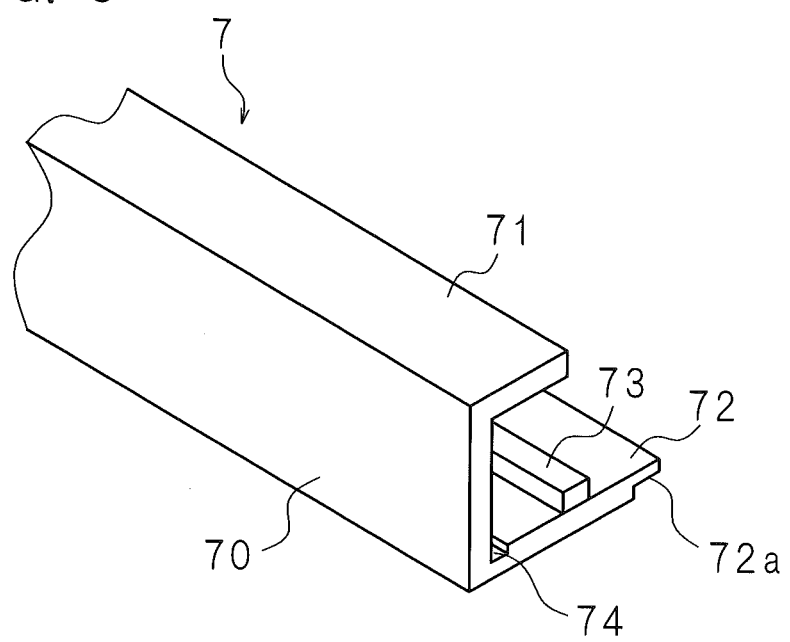
FIG. 6 is a perspective view of a heat spreader according to Embodiment 2.
Figure 7:
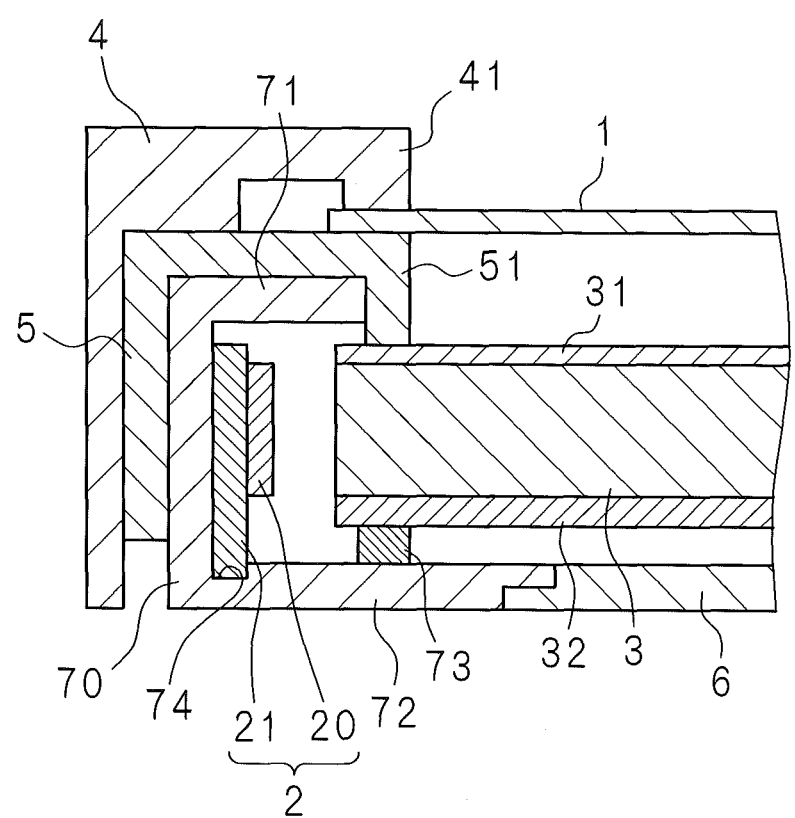
FIG. 7 is a longitudinal sectional view taken on line V-V in FIG. 3.

FIG. 6 is a perspective view of a heat spreader 7 according to Embodiment 2, and FIG. 7 is a longitudinal sectional view taken on line V-V in FIG. 3.

The heat spreader 7 of Embodiment 2 has the same configuration as the above-described heat spreader 7 of Embodiment 1, and further has a groove 74 formed in an upper surface (a surface facing the light source unit 2) of the protrusive plate 72 at a place connecting to the support plate 70. By such the configuration, when sliding the substrate 21 of the light source unit 2 along the groove 74, the light source unit 2 can be attached at an appropriate position with respect to the support plate 70 of the heat spreader 7.

By the above-described configuration, also in Embodiment 2, since the light from the light source unit 2 is shielded (light shielded) by the protrusive plate 71 of the heat spreader 7, it does not reach the panel chassis 5. Thereby, in the liquid crystal panel 1, the light leakage does not occur at the end part on a side in which the light source unit 2 is provided, and thus the luminance at the end part is not increased. In addition, also in Embodiment 2, an increase of manufacturing and assembling processes or an increase of costs do not occur.

In the above-described Embodiments 1 and 2, for the light source device according to the present invention, the light source device for the liquid crystal display apparatus has been described as an example, but the present invention may be applied, for example, to other light source device such as a light source device (lighting device) for indoor lighting.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims. In addition, technical features described in each embodiment may be combined with each other.

It is noted that, as used herein and in the appended claims, the singular forms "a", "an", and "the" include plural referents unless the context clearly dictates otherwise.

The invention claimed is:

1. A light source device comprising:
    a light guide plate comprising:
        (i) a front surface as a light-emitting surface,
        (ii) an end surface as a light-entering surface, and
        (iii) a rear surface which is opposite to the front surface;
    a light source unit comprising:
        (i) a light source disposed to face the end surface of the light guide plate, and
        (ii) a substrate comprising a surface mounting the light source;
    a heat dissipator which supports the light source unit, wherein the heat dissipator comprises:
        (i) a support plate having an inner surface abutting against an opposite surface of the substrate opposite to the surface mounting the light source,
        (ii) a light shielding portion protruded inwardly from a front end of the support plate, and
        (iii) a protrusive plate which protrudes in the same direction as the light shielding portion from a rear end of the support plate;
    a holding member connected to the heat dissipator; and
    a frame member made of resin, wherein the frame member comprises:
        (i) a front part having a rear surface which covers a peripheral edge of the front surface of the light guide plate,
        (ii) a side part continuous with an outer periphery of the front part and having an inner surface abutting against an outer surface of the support plate, and
        (iii) a light guide plate pressing portion continuous with an inner periphery of the front part and extending from the rear surface of the front part toward the front surface of the light guide plate so as to abut against an optical sheet adhered to the front surface of the light guide plate,
    wherein
        the light shielding portion abuts against the entire area between the front end and the light guide plate pressing portion on the rear surface of the front part of the frame member,
        the protrusive plate is engaged to the holding member disposed to face the rear surface of the light guide plate, and
        the light guide plate pressing portion and the protrusive plate clamp the light guide plate.

2. The light source device according to claim 1, wherein the light guide plate pressing portion and a second light guide plate pressing portion provided in the protrusive plate clamp the light guide plate.

3. The light source device according to claim 1, wherein an inner peripheral surface of the frame member abuts against outer peripheral surfaces of the support plate and the light shielding portion of the heat dissipator.

4. The light source device according to claim 1, wherein the light shielding portion and the protrusive plate have a shape of overlapping with an end edge part including the end surface of the light guide plate.

5. The light source device according to claim 1, herein the protrusive plate has a groove formed in a surface thereof facing the light source at a place connecting to the support plate.

6. A display apparatus comprising:
    the light source device according to claim 1; and
    a display panel which displays an image using light emitted from the light source device.

7. The light source device according to claim 1, wherein a protrusive edge of the protrusive plate is engaged with an end surface of a bottom plate of the holding member.

8. The light source device according to claim 5, wherein the light source unit is supported by the heat dissipator when an end part of the substrate of the light source unit is fitted into the groove along the groove.

* * * * *